United States Patent
Ishida et al.

(10) Patent No.: US 6,748,814 B2
(45) Date of Patent: Jun. 15, 2004

(54) LOAD DETECTION STRUCTURE FOR VEHICLE SEAT

(75) Inventors: Toshiaki Ishida, Tokyo (JP); Hiromitsu Ogasawara, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 27 days.

(21) Appl. No.: 10/290,200

(22) Filed: Nov. 8, 2002

(65) Prior Publication Data

US 2003/0131671 A1 Jul. 17, 2003

(51) Int. Cl.$^7$ ................................................ G01L 1/26
(52) U.S. Cl. ............................ 73/862.391; 73/862.39; 73/2; 177/136; 180/273
(58) Field of Search ................... 73/862, 41, 862.07, 73/862.381, 862.391, 862.392, 862.393, 862.473; 177/136, 154, 210, 211; 180/273; 280/734, 735

(56) References Cited

U.S. PATENT DOCUMENTS

| | | | | |
|---|---|---|---|---|
| 6,323,443 B1 | * | 11/2001 | Aoki et al. | 177/144 |
| 6,345,543 B1 | * | 2/2002 | Aoki | 73/862.474 |
| 6,520,023 B2 | * | 2/2003 | Kimura | 73/795 |
| 6,561,300 B1 | * | 5/2003 | Sakamoto et al. | 180/273 |
| 6,571,647 B1 | * | 6/2003 | Aoki et al. | 73/862.381 |
| 6,640,653 B1 | * | 11/2003 | Ishida | 73/862.627 |
| 2003/0067196 A1 | * | 4/2003 | Sakamoto et al. | 297/217.1 |
| 2003/0084731 A1 | * | 5/2003 | Muraishi | 73/849 |

FOREIGN PATENT DOCUMENTS

| | | |
|---|---|---|
| JP | 11-304579 | 10/1999 |
| JP | 11-1153 | 4/2000 |

* cited by examiner

Primary Examiner—Edward Lefkowitz
Assistant Examiner—Alandra Ellington
(74) Attorney, Agent, or Firm—Browdy and Neimark, P.L.L.C.

(57) ABSTRACT

A load detection structure for seat having support leg member, which comprises: a load detection unit whose one end portion is pivotally provided in the support leg member; a limiter element for limiting vertical movement of another end portion of the load detection unit; and a stopper element for limiting further excessive vertical movement of such another end portion. The load detection unit is connected via bolts and nuts with the seat and includes: a strain plate member; a reinforcement plate member attached on a securing portion of the strain plate member through which the bolts and nuts pass; and a buffer cover member which is attached to a free end of the strain plate member, defining the afore-said another end portion of the load detection unit. A strain gauge is provided at a deflectable area of the strain plate member. The stopper element is provided at the bolt.

11 Claims, 5 Drawing Sheets

LOAD DETECTION STRUCTURE FOR VEHICLE SEAT

BACKGROUND OF INVENTION

1. Field of the Invention

The present invention relates to a structure allowing for detection of a load applied to a vehicle seat. In particular, the invention is directed to such load detection structure for use in a vehicle seat, in which a load detection element is mounted between the seat and support leg members in a suspended way.

2. Description of Prior Art

There have been known a passenger detection system for detecting the presence and absence of a passenger or driver in a seat of vehicle in advance before actuating or stopping the associated mechanical elements to automatically control various functions and mechanisms built in the seat.

Normally, the passenger detection system employs various sensors (e.g. a pressure sensitive element) which detect the weight of a passenger on a seat and emit a signal to electronic control systems for automatic control of various mechanical elements related to the seat. Most of the sensors are of a simple structure which can only sense the presence and absence of passenger on a seat, but the recent high-tech control technology inevitably requires that the sensors should further detect whether the passenger is an adult or a child as with an air bag control system for instance.

To meet the demand, there have been proposed sensor systems for numerically detecting the weight of passenger or a corresponding load applied to the seat, determining whether the passenger is adult or child, according to a numerical data obtained, and then controlling and adjusting the associated mechanical elements to optimal conditions suited for the adult or child (e.g. controlling air bag), as disclosed from the Japanese Laid-Open Patent Publications No. 11-304579 for instance. As known form such publication, a load applied to the seat is detected by load sensor which includes one mode of sensor for directly sensing the load or another mode of sensor using a deformable material which directly receives the load and a strain gauge for detecting a degree of deformation of that deformable material, to thereby detect a precise load applied to the seat. In any case, the sensors directly receives a load applied to the seat and therefore it is required that a load detection system should be provided with a high sensitivity to precisely detect a weight of any person in a wide range including children and adults, and further the load detection system be provided with a high protection against an overload due to such an emergency accident as a collision. According to the Japanese Pub. No. 11-304579, there is provided a vertical movement restriction mechanism for restricting an excessive vertical movement of seat so as to prevent exertion of an excessive load on the load detection system and thus protect the load detection system itself against damage. Thus, this prior art is advantageous in attaining a high sensitivity to a load and a high protection against a damage from excessive vertical movement of seat.

The excessive vertical movement of seat is not only due to a traffic accident such as a collision, but also due to an instantaneous great load which is caused when a relatively heavy passenger suddenly sits on the seat, or due to extremely hard vertical vibrations or extraordinary instantaneous input of a great load which is caused during running of a vehicle on a rough road or when the vehicle falls in recesses in the road.

In general, most of known vertical movement restriction mechanism is designed to withstand the foregoing instantaneously applied great load and enough to protect the load detection system against deformation and damage. However, the conventional vertical movement restriction mechanism is formed by rigid constituent elements, which means that a great impact and contact will easily be caused among the parts in the abovementioned great load exertion cases and therefore, an objectionable noise will be generated from such keen contacts among the rigid constituent elements.

Although such objectionable noise generation is not any particular problem only in such emergency accident as a collision, it is with a high frequency that an instantaneous excessive exertion of great load on a vehicle seat will occur normally when a passenger suddenly sits on the seat. Such instantaneous excessive exertion of great load will cause a keen contact among rigid elements forming the above-described vertical movement restriction mechanism and result in generation of an objectionable noise therefrom. This objectionable noise gives a seat occupant an unpleasant feeling. Further, this kind of conventional load detection system includes such additional elements as arm members or the like in order to attain a high sensitivity to a load to be applied thereto, which means to require an increased parts in the detection structure, thus resulting in a more complicated structure. Furthermore, the conventional load detection system includes some members associated with a seat and support leg members as one of the constituent elements, and therefore, the assembly of the detection system as a whole becomes difficult, as a result of which, the assembling processes will be time-consuming and become slow.

SUMMARY OF THE INVENTION

In view of the above-stated drawbacks, it is therefore a primary purpose of the present invention to provide an improved load detection structure for a vehicle seat, which is of simplified structure without any objectionable noise generated there and designed to protect the associated main load detection element against damage when an excessive great load is applied thereto while maintaining a high sensitivity to a load normally applied from a weight of a seat occupant.

In order to achieve such purpose, in accordance with the present invention, the load detection structure is basically comprised of:

a load detection unit for detecting a load to be inputted from said seat, said load detection unit comprising:

a strain plate member of a generally oblong shape having a rigid yet elastic property which tends to recover itself into the generally oblong shape even after it is deflected, said strain plate member having a free end portion, a securing portion, a base end portion, and a deflectable area between said securing and base end portions;

a reinforcement plate means so provided on said strain plate member as to lie on said securing portion;

a sleeve means provided in said securing portion of said strain plate member a strain gauge means attached firmly on said deflectable area of said strain plate member; and a buffer cover means attached on and over said free end portion of said strain plate member;

said load detection unit being provided in said support leg means in a vertically movable manner, such that the base end portion thereof is pivotally connected between said pair of vertically extending lateral walls of said support leg member to allow vertical movement of said free end portion of the strain plate member within said support leg means;

a nut means fixed to said seat;

an opening means defined in said bottom wall of said support leg means;

a bolt means including a threaded portion to be threaded engaged in said nut means;

said load detection unit being connected at the securing portion thereof to said seat by inserting said bolt means through said opening means and said sleeve means and threadedly engaging the bolt means in said nut means;

a vertical movement limiting means for limiting vertical movement of said load detection unit, said vertical movement limiting means including a limited space defined therein and being fixedly provided in said support leg member in such a manner as to surround said buffer cover means associated with said load detection unit, thereby limiting said vertical movement of both said buffer cover means and free end portion within the limited space; and a stopper means for preventing further vertical movement of both said buffer cover means and free end portion of the strain plate member in a direction exceeding said limited space of the vertical movement limiting means, said stopper means including a limited gap defined therein for limiting said further vertical movement, with such an arrangement that, when an excessive great load is applied to said seat, the vertical movement of both said buffer cover means and free end portion unit due to said excessive great load is limited by said vertical movement limiting means, after which, the excessive vertical movement of said cover means and free end portion is prevented by said stopper means.

Preferably, the vertical movement limiting means may comprise a limiter ring member of generally rectangular shape having an upper portion defining an upper limit in the limited space and a lower portion defining a lower limit in the limited space, so that the buffer cover means of the load detection unit is brought to contact with one of the upper and lower portions of limiter ring member when said excessive great load is applied to the seat, thereby limiting the vertical movement of load detection unit.

Preferably, the sleeve means may include a rivet portion fixedly riveted to the securing portion of strain plate member, thereby defining a riveted end portion of the sleeve means thereon. In this connection, the stopper means may comprise the riveted end portion of sleeve means and a head portion formed on the bolt means at a side opposite to the headed portion, the head portion projecting outwardly through the opening means, such that the limited gap is defined between the head portion and riveted end portion, wherein both of the head portion and riveted end portion are larger in diameter than the opening means.

Other advantages and features of the present invention will become apparent from descriptions hereinafter, with reference to the annexed drawings.

DETAILED DESCRIPTION OF PREFERRED EMBODIMENT OF THE INVENTION

Figure 1:
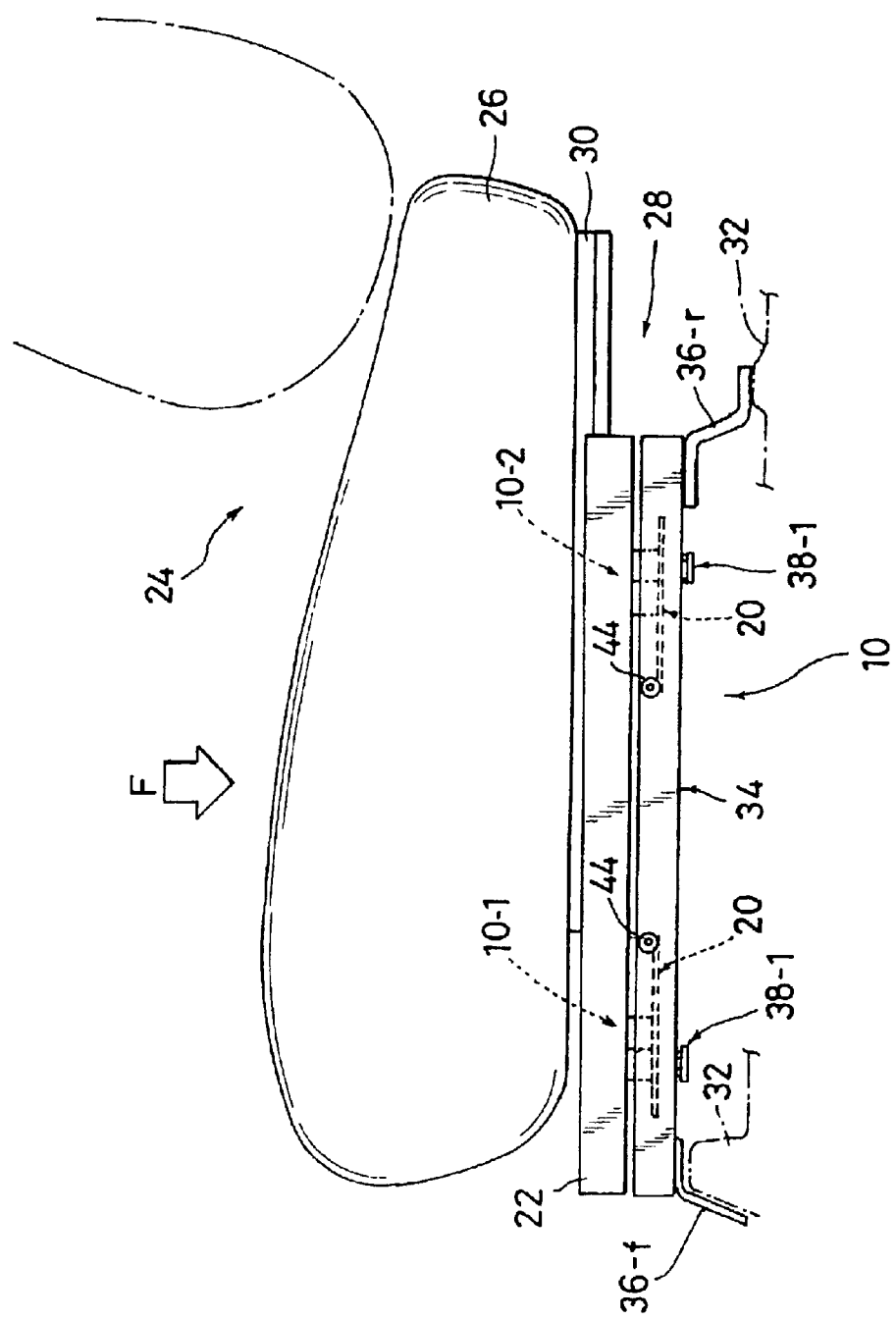
FIG. 1 is a schematic side elevational view of a vehicle seat provided with a load detection structure of the present invention.

Referring to FIGS. 1 through 5, there is illustrated one preferred mode of load detection structure applicable to a vehicle seat in accordance with the present invention. Reference is first made to FIG. 1 in which the designation (10) generally represents a load detection structure provided between a slide rail device (28) and a support leg member (34) in a suspended manner.

The slide rail device (28) comprises a stationary lower rail (22) and a movable upper rail (30) slidably fitted in and along the lower rail (22). As seen from FIG. 1, the upper rail (30) is fixedly attached to a seat cushion (26) of a vehicle seat (24), whereas the lower rail (22) is securely and operatively attached via the load detection structure (10) upon the support leg member (34). Support leg member (34) has a forward vertical securing leg portion (36-$f$) and a backward vertical securing leg portion (36-$r$). As shown, those two securing leg portions (36-$f$) (36-$r$) are firmly fastened to a floor (32) of vehicle.

Though not shown clearly, in fact, both slide rail device (28) and support leg member (34) are each provided in pair. Namely, a pair of slide rail devices (28) are provided under the bottom of seat cushion (26) and a pair of support leg members (34) are provided for supportively receiving those two slide rail devices (28) thereon, respectively. Of course, the load detection structure (10), a principal part of the present invention, is interposed between each slide rail device (28) and each support leg member (34), and therefore a pair of load detection structures (10) are arranged under the seat (24).

According to the embodiment shown in FIG. 1, the load detection structure (10) is divided into forward and rearward load detection structures (10-1) (10-2) which are respectively disposed in the forward and rearward regions of a mutually mated pair of lower rails (22) and support leg member (34). Therefore, as far as the present embodiment is concerned, while not shown, it follows that a pair of forward load detection structures (10-1) are so arranged forwardly of the seat (24) that they are respectively disposed in the forward regions of left-side mated pair of lower rail (22) and support leg member (34) and in the forward regions of right-side mated pair of lower rail (22) and support leg member (34), whereas a pair of rearward load detection structures (10-2) are so arranged rearwardly of the seat (24) that they are respectively disposed in the rearward regions of right-side mated pair of lower rail (22) and support leg member (34) and in the rearward regions of left-side mated pair of lower rail (22) and support leg member (34). Since all the load detection structures (10-1) (10-2), the pair of slide rail devices (28) and the pair of support leg members (34) are identical in structure to one another, description will be made only of one forward load detection structure (10-1) in one of the two slide rail devices (28) and one of the two support leg members (34), for the sake of simplicity.

In accordance with the present invention, the load detection structure (10) includes a load detection means (20) workable to detect an amount of a load (F) applied vertically from a seat occupant to the seat (24).

The load detection means (20) is basically embodied by: a strain plate member (12) having an elastic yet rigid property; and a strain gauge (18) attached on the strain plate member (12). In that strain plate member (12), there are formed a free end portion (12d); a base end portion (12b); a securing portion (12a) defined between the free and base end portions (12d) (12b); and a deflectable area (12c) defined between the securing portion (12a) and base end portions (12b). As shown, the strain gauge (12) is fixedly attached on the deflectable area (12c) in order to detect a deflection of the plate member (12).

The strain plate member (12) is preferably formed from an oblong plate spring material (a steel or the like) having a recovery property which tends to elastically recover itself into a normal horizontal plate shape even after it has been bent by a great load. A pair of first and second holes (14h-1) (14h-2) are formed in the securing portion (12a) of the plate member (12) and three connecting holes (12h-3) are formed in the base end portion (12b) of the same.

Figure 3:
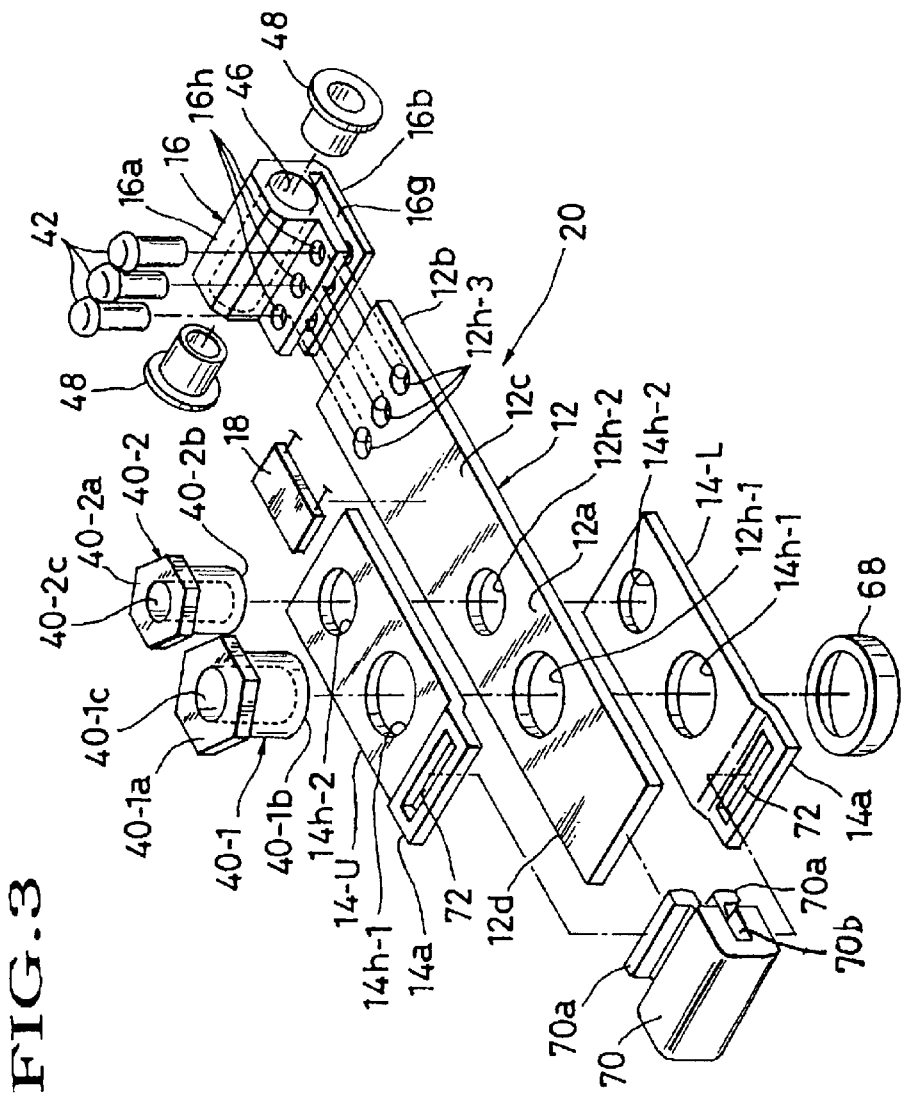
FIG. 3 is a schematic exploded perspective view of a load detection unit in the load detection structure.
Figure 4:
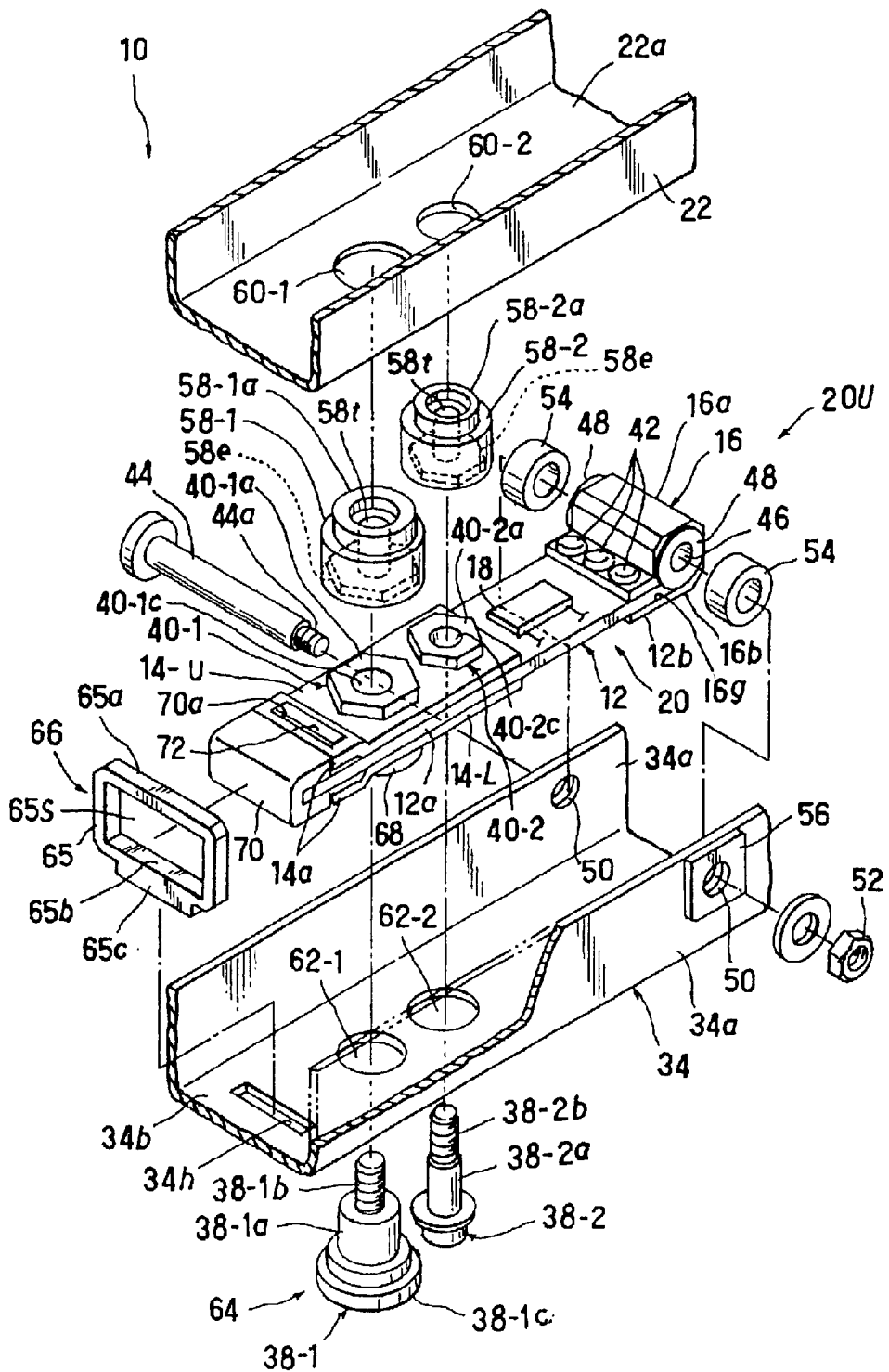
FIG. 4 is a partly broken and exploded schematic perspective view of the load detection structure.
Figure 5:
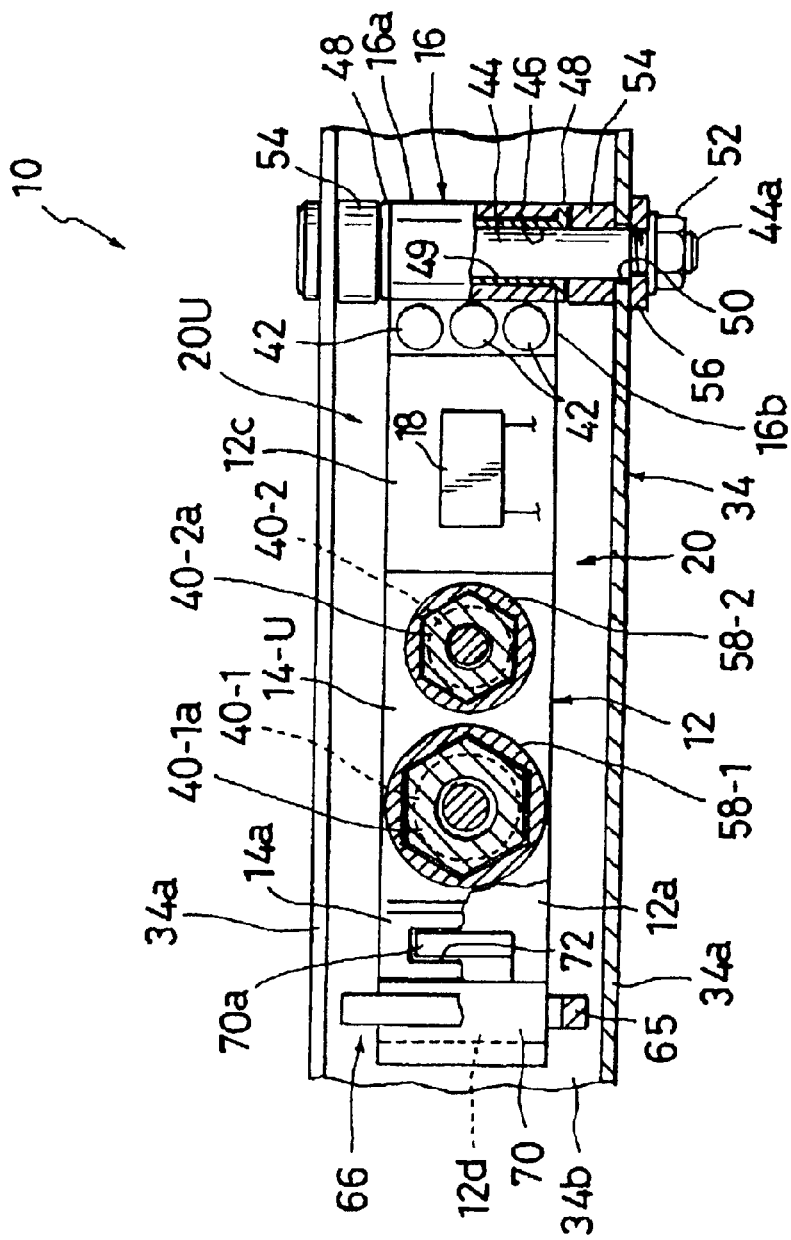
FIG. 5 is a partly broken fragmentary schematic plan view of the load detection structure.

As seen from FIGS. 3 and 4, a pair of first and second reinforcement plates (14-U) (14-L) are attached to the upper and lower surfaces of both free end portion (12d) and intermediate portion (12a) of the strain plate member (12), respectively. The first reinforcement plate element (14-U) is formed with a pair of first and second holes (14h-1) (14h-2) and a securing end portion (14a) having a rectangular hole (72) formed therein, and likewise, the second reinforcement plates (14-L) is formed with a pair of first and second holes (14h-1) (14h-2) and a securing end portion (14a) having a rectangular hole (72) formed therein.

Designation (40-1) denotes a first rivet sleeve having: a non-circular (hexagonal) head (40-1a) projecting radially and horizontally from the upper end thereof; a through-bore (40-1c); and a lower end (40-1b). Designation (40-2) denotes a second rivet sleeve having: a non-circular (hexagonal) head (40-2a) projecting radially and horizontally therefrom; a through-bore (40-2c); and a lower end (40-2b). Designation (70) denotes a buffer cover member formed from a relatively soft material such as a synthetic resin material, which is of generally "C" cross-section and has a securing groove (70b) and a pair of engagement lugs (70a) (70a) as illustrated. Further, designation (16) denotes a bearing member comprising an upwardly projected body portion (16a) having a through-bore (46) formed therein and a connecting portion (16b) in which a connecting groove (16g) and three connecting holes (16h) are formed. The connecting portion (16b) extends horizontally from the lower end portion of the body portion (16a). As shown, a pair of oilless bushes (48) (48) are fitted in the two opposite openings of the through-bore (46). Of course, a grease may be applied to the inside of the through-bore (46).

As viewed from FIG. 3, in assembly, at first, the buffer cover member (70) is frictionally secured to the free end portion (12d) of strain plate member (12) by engaging the securing groove (70b) over that particular free end portion (12d) while engaging the two engagement lugs (70a) in the two rectangular holes (72) associated with the first and second reinforcement plates (14-U) (14-L), respectively. In that way, the two reinforcement plates (14-U) (14-L) are juxtaposed with the upper and lower surfaces of the strain plate member (12), respectively, so that the paired holes (14h-1) (14h-2) of first reinforcement plate (14-U) and the paired holes (14h-1) (14h-2) of second reinforcement plate (14-L) are respectively aligned with the two holes (12H-1) (12H-2) of strain plate member (12). Then, as can be seen from FIG. 3, the first and second rivet sleeves (40-1) (40-2) are inserted into one set of the aligned holes (14h-1, 12h-1, 14h-1) and another set of the aligned holes (14h-2, 12h-2, 14h-2), respectively. At this point, a stopper ring (68) is attached to the lower end (40-1b) of the first rivet sleeve (40-1). It is noted that the stopper ring (68) is one element of a stopper means (64) which will be described later. Thereafter, as seen from FIG. 2, the lower end (40-1b) of first rivet sleeve (40-1) is riveted via the stopper ring (68) on the outer surface of the second reinforcement plate (14-L) while the lower end (40-2b) of second rivet sleeve (40-2) is riveted directly on the outer surface of second reinforcement plate (14-L). Then, the bearing member (16) is securely connected to the base end portion (12b) of the strain plate member (12) by inserting the base end portion (12b) of strain plate member (12) into the connecting groove (16g) of bearing member (16) and then inserting and riveting three rivet pins (42) in the aligned connecting three holes (12h-3) (16h) respectively of the strain plate member (12) and bearing member (16). Finally, the strain gauge (18) is firmly attached on the deflectable area (12c) of strain plate member (12). Though not shown, the strain gauge (18) is a conventional strain gauge formed by a plate member and a sinuous metal resistance wire embedded therein, with a pair of lead wires projecting therefrom. In that manner, one load detection unit (20U) (see FIG. 4) is assembled, which is in a state ready to be mounted in the support leg member (34).

Referring now to FIG. 4, the thus-assembled load detection unit (20U) is placed in the support member (34). It is noted here that the support leg member (34) is of a generally "U" shape in cross-section, having a pair of vertical walls (34a) (34a) and a flat bottom wall (34b) defined between those two vertical walls (34a), and that a pair of first and second guide holes (62-1) (62-2) are formed in the flat bottom wall (34b) while a pair of bearing holes (50) (50) are formed in the respective two vertical walls (34a) (34a). Designation (34h) denotes a securing slit formed in that bottom wall (34b) in the vicinity of the two holes (62-1) (62-2). As shown, a pivot pin (44) is inserted into one of the two bearing holes (50) and then inserted through the through-bore (46) and the two oilless bushes (48) via two spacers (54) (54), so that the threaded end portion (44a) of the pivot pin (44) projects from another of the two bearing holes (50). By threadedly attaching a nut (52) to such threaded end portion (44a), the assembled load detection unit (12U) is rotatably journalled via the pivot pin (44) within the support member (34). Designation (56) denotes a reinforcement plate firmly welded to the area of the vertical wall (34a) surrounding the bearing hole (50) with a view to reinforcing that particular area. As best shown in FIG. 4, a pair of first and second securing nuts (58-1) (58-2) are provided, each of which is a rivet-type nut whose end can be riveted. The first and second securing nuts (58-1) (58-2) are respectively formed with circular rivet end portions (58-1a) (58-2a) that can be riveted as will be described. Each of the two securing nuts (58-1) (58-2) has a threaded bore (58t) formed therein and also has a non-circular (or hexagonal) bore (58e) which communicates with the threaded bore (58t) as can be seen by the phantom lines in FIG. 4.

On the other hand, in the lower rail (22), first and second securing holes (60-1) (60-2) are formed, as illustrated, so as to be in a concentric relation with the aforementioned one set of aligned holes (14h-1, 12h-1, 14h-1) and another set of aligned holes (14h-2, 12h-2, 14h-2), respectively. Also, in the bottom wall (34b) of support leg member (34), the first and second guide holes (62-1) (62-2) are of course in a concentric relation with the aforementioned one set of aligned holes (14h-1, 12h-1, 14h-1) and another set of aligned holes (14h-2, 12h-2, 14h-2).

Figure 2:
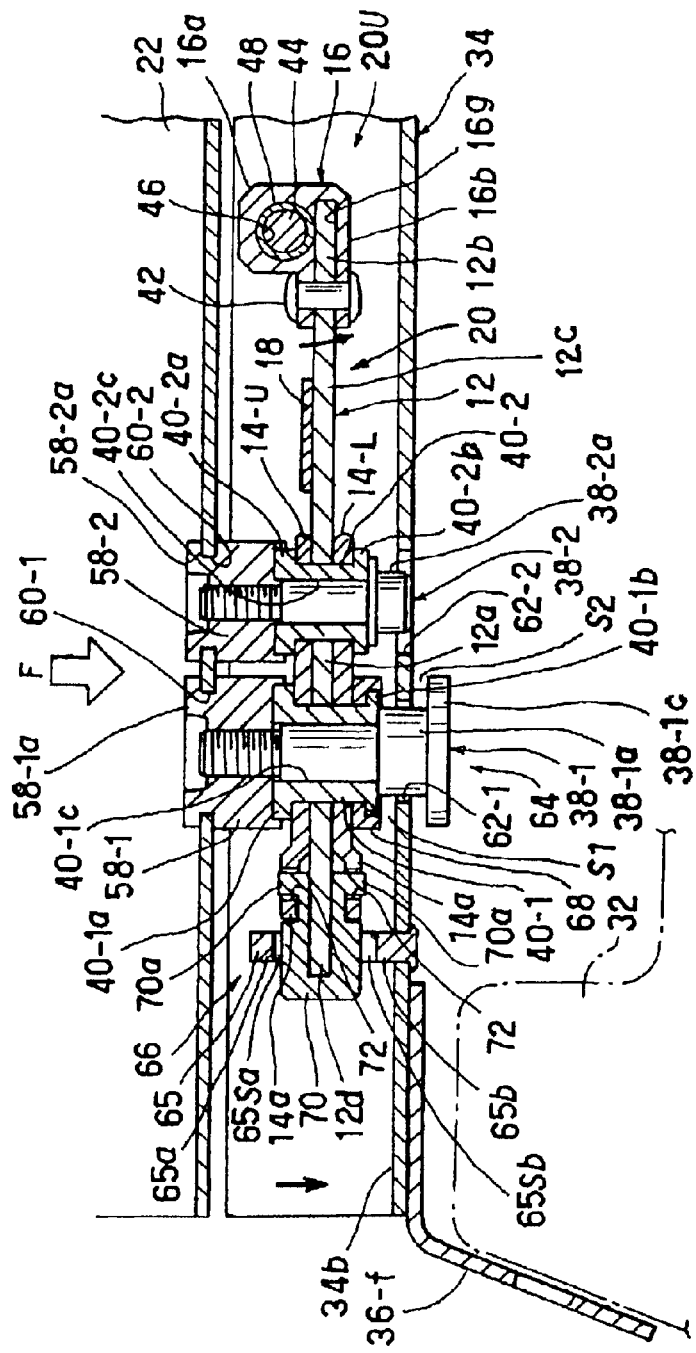
FIG. 2 is a longitudinally sectional view of the load detection structure.

As understandable from FIGS. 2 and 4, the rivet end portions (58-1a) and (58-2a) of the first and second securing nuts (58-1) (58-2) are respectively inserted and riveted in the first and second securing holes (60-1) (60-2) whereupon those two nuts (58-1) (58-2) are firmly fixed in the first and second securing holes (60-1) (60-2), respectively, with both bodies of the rivet end portions (58-1a) (58-2a) pendent from the bottom wall (22a) of lower rail (22) such that both two non-circular holes (58e) open in the downward direction.

Further, in accordance with the present invention, a vertical movement limiting means (66) is provided to not only limit the vertical resilient deflection of the strain plate member (12) within a predetermined range that allows precise detection of a seat occupant's weight, but also protect the strain plate member (12) against deformation and breakage. The details of such means (66) will be elaborated later. Preferably, the vertical movement limiting means (66) may be embodied by a limiter ring element (65) of generally rectangular shape as best shown in FIG. 4. The illustrated limiter ring element (65) includes an upper horizontal ring portion (65a) serving as an upper limit of upward excessive movement of the strain plate member (12), a lower horizontal ring portion (64b) serving as a lower limit of downward excessive movement of the strain plate member (12), and a securing lug portion (65c). Hence, the limiter ring element (65) has, defined therein, a predetermined limited space (65S) between the upper and lower horizontal ring portions (65a) (64a) for a purpose to be set forth later.

Fixation of this limiter ring element (65) to the support leg member (34) is such that, while inserting the free end or buffer cover member (70) of load detection unit (20U) partway through the ring element (65), the securing lug portion (65c) of ring element (65) is fixed in the securing slit (34h) as by welding. As seen in FIG. 2, the buffer cover member (70) is normally situated at and within the limiter ring element (65). More specifically, the buffer cover member (70) is normally positioned at a point near to the upper horizontal portion (65a) with a small upper limited gap (65Sa) given between the upper surface of the buffer cover member (70) and the upper horizontal portion (65a). On the other hand, a certain lower limited gap (65Sb) is given between the lower surface of the buffer cover member (70) and the lower horizontal portion (65a). Accordingly, it is seen that the load detection unit (20U) is mounted in position within the support leg member (34) while being prevented by the limiter ring element (65) against excessive outward rotation from that inside of support leg member (34), which means that the load detection unit (20U) is positioned in an optimal manner within the support leg member (34) and ready to be easily assembled with other elements (i.e. the lower rail (22), the securing nuts (58-1) (58-2) and two guide bolts (38-1) (38-2) which will be described below).

Turning back to FIG. 4, designation (38-1) (38-2) represent a first securing bolt (38-1) and a second securing bolt (38-2), respectively. The first securing bolt (38-1) has a columnar guide body (38-1a) and a threaded securing portion (38-1b). Likewise, the second securing bolt (38-2) has a columnar guide body (38-2a) and a threaded securing portion (38-2b).

In accordance with the present invention, a stopper means, as generally designated by (64), is provided to not only limit further excessive vertical deflection of the load detection unit (20U) to a degree in excess of the afore-said predetermined limited space (65S) of the vertical movement limiting means (66) or the limiter ring element (65), but also prevent separation of the upper rail (22) from the support leg member (34). According to the illustrated embodiment, as shown in FIG. 2, such stopper means (64) includes a limited space for that purpose, which is divided into an upper limited gap (S1) and a lower limited gap (S2) with respect to the bottom wall (34b) of support leg member (34). Specifically, the illustrated stopper means (64) comprises a circular head portion (38-1c) formed on the end of columnar guide body (38-1a) and the previously stated stopper ring (68). Such limited space of stopper means (64) is a space given between the circular head portion (38-1c) and stopper ring (68), such that the upper limited gap (S1) is defined between the stopper ring (68) and the bottom wall (34b) while on the other hand, the lower limited gap (S2) is defined between the circular head portion (38-1c) and the bottom wall (34b). As shown, both circular head portion (38-1b) and stopper ring (68) are lager in diameter than the first guide hole (62-1).

In further assembly, as understandable from FIGS. 2 and 4, the lower rail (22) with the first an second securing nuts (58-1) (58-2) fixed thereto is brought to the support leg member (34) so that the non-circular bore (58e) of the first rivet sleeve (58-1) and the non-circular bore (58e) of the second rivet sleeve (58-2) are respectively engaged over the non-circular head (40-1a) of first rivet sleeve (40-1) and the non-circular head (40-2a) of second rivet sleeve (40-2). It is therefore seen that the threaded bores (58t) (58t) respectively of the first and second securing nuts (58-1) (58-1) are aligned with the two through-bores (40-1c) (40-2c) respectively of the first and second rivet sleeves (40-1) (40-2). Under that state, the first guide bolt (38-1) is inserted through both first guide hole (62-1) and through-bore (40-1c) and screwed in the threaded bore (58t) of the first securing nut (58-1), while likewise the second guide bolt (38-2) is inserted through both second guide hole (62-2) and through-bore (40-2c) and screwed in the threaded bore (58t) of the second securing nut (58-2). Then, as shown in FIG. 2, the lower rail (22) is connected via the load detection unit (20U) to the support leg member (34).

With the above-described construction of the load detection means (20), it can be seen from FIG. 2 that, when a vertical load or a weight of occupant on the seat (24), as designated by (F), is applied to the slide rail device (28) and thus to the lower rail (22), the corresponding downward force is directly imparted to the securing portion (12a) of strain plate member (12), thereby causing downward rectilinear displacement of that particular securing portion (12a) as indicated by the downward arrow in FIG. 2. This downward rectilinear displacement is made positive by the concurrent downward displacement of the first and second guide bolts (38-1) (38-2) through the respective first and second guide holes (62-1) (62-2). Simultaneous therewith, the base end portion (12b) of the strain plate member (12) is caused by such downward displacement to rotate downwardly as indicated by the curved arrow in FIG. 2 relative to the pivot pin (44). As a result thereof, a deflection is caused in the deflectable area (12c) (see FIG. 3) of strain plate member (12), in response to which, the strain gauge (14) immediately detects an amount of such deflection, and determines it as a weight of the occupant on the seat (24). Then, a corresponding electric signal is emitted from the gauge (14) to a control unit (not shown). It is to be appreciated here that the provision of two reinforcement plates (14-U) (14-L) is effective in not only rendering the securing portion (12a) of strain plate member (12) hard and rigid against vertical great load applied thereto, but also intensively making the deflectable area (12c) of strain plate member (12) less hard relative to such reinforced securing portion (12a), whereupon that particular deflectable area (12c) is made easier to deflect than other portions of the strain plate member (12) upon a load being exerted thereon, thereby increasing a quick sensitivity of the strain gauge (12) to the deflection of the strain plate member (12).

As constructed above, in accordance with the load detection structure of the present invention, when an excessive great load (F) is applied to the seat (24), causing the strain plate member (12) to deflect downwardly to a level in excess of the lower limited space (65S) of the limiter ring element (65S), the free end or buffer cover member (70) of load detection unit (20U) is brought to contact with the lower horizontal ring portion (65b) of limiter ring element (65), thereby protecting the deflectable area (12c) of strain plate member (12) against undesired deflection in excess of tolerable range in which the strain gauge (18) can work for precise detection of the deflection amount of that particular area (12c). Such contact between the strain plate member (12) and limiter ring element (65) quickly establishes a load transmission passage through which a part of the excessive great load (F) is allowed to quickly transmit from the limiter ring element (65) to the support leg member (34), whereby an excessive amount of the load (F) is escaped from the strain plate member (12) to the floor (32). Thus, a whole of the strain plate member (12) is protected against damage and deformation. Following such action of vertical limiting means (66) with a slight delay, the stopper ring (68), one of the stopper means (64), is moved downwardly in the upper limited gap (S1) and brought to contact with the bottom wall (34b) of support leg member (34), thereby escaping a remaining amount of the excessive load (F) from the stopper ring (68) to the support leg member (34) and then to the floor (32).

Accordingly, any more excessive great load that might exceed the tolerable strength of both strain plate member (12) and limiter ring element (65) will be escaped through such stopper means to the floor (32), thereby insuring to protect the strain plate member (12) against damage. In particular, the deflectable area (12c), a most fragile portion of the strain plate member (12), is completely protected from direct shock caused by the excessive great load.

Further, if an upward excessive force is applied to the seat (24), forcing the seat (24) upwardly from the floor (32) and tending to separate the lower rail (22) from the support leg member (34), the circular head portion (38-1c), one of the stopper means (64), is moved upwardly in the upper limited gap (S2) and brought to contact with the bottom wall (34b) of support leg member (34), thereby preventing both detection unit (20U) and lower rail (22) against separation from the support leg member (34).

In this embodiment, the stopper means (64) (i.e. the stopper ring (68) and circular head portion (38-1c)) utilizes the first securing bolt (38-1) by which the strain plate member securing portion (12a) is secured to the lower rail (22). Hence, the stopper means (64) is disposed right below the point to which the excessive great load (F) will be imparted directly. With this structure, a shortest load transmission passage is attained, through which the excessive great load (F) applied from the seat will be smoothly and quickly transmitted via the stopper means (64) to the support leg member (34) and the floor (32).

The vertical movement limiting means (66) comprises one piece of the limiter ring element (65) which surrounds one small part of the free end portion of the strain plate member (12), and therefore, the whole size of the means (66) is made small.

Owing to the soft property of the buffer cover material (70), even when the free end portion of the strain plate material (12) is strongly contacted with the limiter ring element lower horizontal portion (65b), an undesired great impact is reduced therebetween without any unpleasant noise.

As shown in FIG. 4, since the rivet sleeves (40-1, 40-2) and securing nuts (58-1, 58-2) are formed with hexagonal head portions (40-1a, 40-2a) and hexagonal bores (58e, 58e), all those rivet sleeves and securing nuts are easily engaged together via their mated hexagonal head portions and bores without being rotated and dislocated in any angle. Therefore, the lower rail (22) can be precisely positioned at a predetermined point relative to the strain plate member (12) without dislocation and then both two guide/securing bolts (38-1) (38-2) can be smoothly inserted and screwed in one paired rivet sleeve and nut (40-1) (58-1) and another paired rivet sleeve and nut (40-2) (58-2), respectively. In this screwing stage, conventionally, such sorts of bolts (38-1) (38-2) are simply screwed through those securing elements, which will however rotate and dislocate the strain plate member (12) or the load detection unit (20U) from a predetermined position relative to the pivot pin (44), as a result of which, the bearing member (16) of load detection unit (20U) can hardly be rotated about the pivot pin (44) due to a pressed contact of the pivot pin (44) with the through-bore (46) of the bearing member (16). But, in accordance with the present invention, the engagement of such non-circular heads and bores (40-1a, 40-2a, 58e, and 58e) completely prevents the foregoing rotation and dislocation of the load detection unit (20U) from the predetermined position, thus insuring smooth rotation of the bearing member (16) about the pivot pin (44).

While having described the present invention, it should be understood that the invention is not limited to the illustrated embodiment, but any other modification, replacement and addition may be applied thereto without departing from the appended claims. For example, the second guide/securing bolt (38-2) may also be formed with a circular head portion which is identical to the one (38-1c) of the first guide/securing bolt (38-1) as the stopper means (64). The strain gauge (18) be attached on the bottom surface of the strain plate member (12). Instead of the two reinforcement plates (14-U) (14-L), only one of them may be affixed on a desired one of upper and lower surfaces of the strain plate member (12). The buffer cover member (70) be formed in such a configuration that can be firmly attached to the securing portion (12a) of the plate member (12) via the bolts (38 (38-1) (38-2). The load detection unit (20U) may be secured directly to the bottom side of the seat cushion (26) in the case where the seat (24) has no slide rail device (28). The use of this load detection structure is not limited to a vehicle, but may be applied to a train, airplane, vessels and the like.

What is claimed is:

1. In combination with a seat having a support leg means for supporting the seat, said support leg means being adapted to be fixed on a floor and also being of a generally "U" shape in cross-section having a bottom wall and a pair of lateral walls vertically extending from the bottom wall, a load detection structure comprising:
  a load detection unit for detecting a load to be applied to said seat, said load detection unit comprising:
    a strain plate element of a generally oblong shape having a rigid yet elastic property which tends to recover itself into the generally oblong shape even after it is deflected, said strain plate element having a free end portion, a securing portion, a base end portion, and a deflectable area between said securing and base end portions;

a reinforcement plate means so provided on said strain plate element as to lay on said securing portion;

a sleeve means provided in said securing portion of said strain plate element a strain gauge means attached firmly on said deflectable area of said strain plate element; and a buffer cover means attached on and over said free end portion of said strain plate element;

said load detection unit being provided in said support leg means in a vertically movable manner, such that said base end portion of said strain plate element is pivotally connected between said pair of lateral walls of said support leg member to allow vertical movement of said free end portion of the strain plate element within said support leg means;

a nut means fixed to said seat;

an opening means defined in said bottom wall of said support leg means;

a bolt means including a threaded portion to be threaded engaged in said nut means;

said load detection unit being connected at the securing portion thereof to said seat by inserting said bolt means through said opening means and said sleeve means and threadedly engaging the bolt means in said nut means;

a vertical movement limiting means for limiting vertical movement of said load detection unit, said vertical movement limiting means including a limited space defined therein and being fixedly provided in said support leg member in such a manner as to surround said buffer cover means associated with said load detection unit, thereby limiting said vertical movement of both said buffer cover means and free end portion within the limited space; and a stopper means for preventing further vertical movement of both said buffer cover means and free end portion of the strain plate element in a direction exceeding said limited space of the vertical movement limiting means, said stopper means including a limited gap defined therein for limiting said further vertical movement, with such an arrangement that, when an excessive great load is applied to said seat, the vertical movement of both said buffer cover means and free end portion due to said excessive great load is limited by said vertical movement limiting means, after which, the excessive vertical movement of said cover means and free end portion is prevented by said stopper means.

2. The load detection structure as defined in claim 1, wherein said sleeve means includes a rivet portion fixedly riveted to said securing portion of said strain plate element, and wherein said nut means also includes a rivet portion fixedly riveted to said seat.

3. The load detection structure as defined in claim 1, wherein said vertical movement limiting means comprises a limiter ring element of generally rectangular shape having an upper portion defining an upper limit in said limited space and a lower portion defining a lower limit in said limited space, so that said buffer cover means of said load detection unit is brought to contact with one of said upper and lower portions of said limiter ring element when said excessive great load is applied to said seat, thereby limiting the vertical movement of said free end portion of said strain plate element.

4. The load detection structure as defined in claim 1, wherein said sleeve means includes a rivet portion fixedly riveted to said securing portion of said strain plate element, thereby defining a riveted end portion of the sleeve means thereon, wherein said stopper means comprises: said riveted end portion of said sleeve means; and a head portion formed on said bolt means at a side opposite to said threaded portion, said head portion projecting outwardly through said opening means, such that said limited gap is defined between said head portion and said riveted end portion, and wherein both said head portion and riveted end portion are larger in diameter than said opening means.

5. The load detection structure according to claim 4, wherein a stopper ring is provided as one of said stopper means, and wherein said rivet portion of the sleeve means is firmly riveted with said stopper ring to said securing portion of said strain plate element, so that said riveted end portion is integrally provided with said stopper ring.

6. The load detection structure according to claim 4, wherein said sleeve means comprises at least two rivet sleeves each having said rivet portion, wherein said bolt means comprises at least two bolts each having a portion larger in diameter than each of said at least two rivet sleeves, such that one of said at least two bolts has said head portion and another of said at least two bolts is devoid of said head portion, and wherein said opening means comprises at least two holes.

7. The load detection structure as defined in claim 1, wherein said nut means includes a non-circular bore portion formed at one end thereof, wherein said sleeve means further includes a non-circular head portion formed at one end thereof, said non-circular head portion being generally equal in size to said non-circular bore portion of said nut means, and wherein said non-circular head portion is engaged in said non-circular bore portion, thereby preventing rotatative dislocation between said nut means and said bolt means.

8. The load detection structure as defined in claim 1, wherein said strain plate element has an upper surface and a lower surface, said reinforcement plate means comprises at least two reinforcement plate members each having an engagement end portion, said at least two reinforcement plate members being respectively attached on said upper and lower surfaces of the strain plate element, wherein said buffer cover means comprises a buffer cover member formed from a resin material, said buffer cover member being of a generally channel cross-section and having an engagement means defined therein, and wherein said engagement end portion of each of said at least two reinforcement plate members is engaged with said engagement means of said buffer cover member.

9. The load detection structure according to claim 8, wherein said engagement means associated with said buffer cover member comprises a pair of securing holes.

10. In combination with a seat having a support leg means for supporting the seat, said support leg means being adapted to be fixed on a floor and also being of a generally "U" shape in cross-section having a bottom wall and a pair of lateral walls extending vertically from said bottom wall, a load detection structure comprising:

a load detection unit for detecting a load to be applied to said seat, said load detection unit comprising:

a strain plate element of a generally oblong shape having a rigid yet elastic property which tends to recover itself into the generally oblong shape even after it is deflected, said strain plate element having a free end portion, a securing portion, a base end portion, and a deflectable area between said securing and base end portions;

a reinforcement plate means so provided on said strain plate element as to lay on said securing portion;

a sleeve means provided in said securing portion of said strain plate element, said sleeve means including a rivet portion formed at one end portion thereof, and a non-circular head portion formed at another end portion thereof, wherein wherein said rivet portion is firmly riveted to said securing portion of said strain plate element, thereby defining a riveted end portion of the sleeve means thereon;

a strain gauge means attached firmly on said deflectable area of said strain plate element; and a buffer cover means attached on and over said free end portion of said strain plate element;

said load detection unit being provided in said support leg means in a vertically movable manner, such that the base end portion of said strain plate element is pivotally connected between said pair of lateral walls of said support leg means to allow vertical movement of said free end portion of the strain plate element within said support leg means;

a nut means including a rivet portion formed at one end thereof, said rivet portion being fixedly riveted to said seat, and a non-circular bore portion formed in another end thereof;

an opening means defined in said bottom wall of said support leg means;

a bolt means including a threaded portion and a head portion;

said load detection unit being connected at the securing portion thereof to said seat by inserting said bolt means through said opening means and said sleeve means and threadedly engaging the bolt means in said nut means, such that said non-circular bore portion of said nut means is engaged and fitted in said non-circular head portion of said sleeve means is engaged and fitted in said non-circular bore portion of said nut means, with said head portion of said bolt means projecting outwardly from said bottom wall of said support leg means;

a vertical movement limiting means for limiting vertical movement of said load detection unit, said vertical movement limiting means including a limited space defined therein and being fixedly provided in said support leg element in such a manner as to surround said buffer cover means associated with said load detection unit, thereby limiting said vertical movement of both said buffer cover means and free end portion within the limited space; and a stopper means for preventing further vertical movement of both said buffer cover means and free end portion of the strain plate element in a direction exceeding said limited space of the vertical movement limiting means, said stopper means comprising said riveted portion of said sleeve means and said head portion of said bolt means, such that a limited gap is defined between said riveted portion and said head portion to thereby limit said further vertical movement, with such an arrangement that, when an excessive great load is applied to said seat, the vertical movement of both said buffer cover means and free end portion unit due to said excessive great load is limited by said vertical movement limiting means, after which, the excessive vertical movement of said cover means and free end portion is prevented by said stopper means.

11. In combination with a seat having: a support leg means for supporting the seat, said support leg means being adapted to be fixed on a floor; and a seat slide device disposed between said seat and said support leg means, said seat slide device being adapted to allow the seat to be slidably movable on the support leg means, in which the support leg means is of a generally "U" shape in cross-section having a bottom wall and a pair of lateral walls extending vertically from said bottom wall, a load detection structure comprising:

a load detection unit for detecting a load to be inputted from said seat, said load detection unit comprising:

a strain plate element of a generally oblong shape having a rigid yet elastic property which tends to recover itself into the generally oblong shape even after it is deflected, said strain plate element having a free end portion, a securing portion, a base end portion, and a deflectable area between said securing and base end portions;

a reinforcement plate means so provided on said strain plate element as to lay on said securing portion;

a sleeve means provided in said securing portion of said strain plate element;

a strain gauge means attached firmly on said deflectable area of said strain plate element; and a buffer cover means attached on and over said free end portion of said strain plate element;

said load detection unit being provided in said support leg means in a vertically movable manner, such that the base end portion of said strain plate element is pivotally connected between said pair of lateral walls of said support leg member to allow vertical movement of said free end portion of the strain plate element within said support leg means;

a nut means fixed to said seat slide device;

an opening means defined in said bottom wall of said support leg means;

a bolt means including a threaded portion to be threaded engaged in said nut means;

said load detection unit being connected at the securing portion thereof to said seat by inserting said bolt means through said opening means and said sleeve means and threadedly engaging the bolt means in said nut means;

a vertical movement limiting means for limiting vertical movement of said load detection unit, said vertical movement limiting means including a limited space defined therein and being fixedly provided in said support leg member in such a manner as to surround said buffer cover means associated with said load detection unit, thereby limiting said vertical movement of both said buffer cover means and free end portion within the limited space; and a stopper means for preventing a further vertical movement of both said buffer cover means and free end portion of the strain plate element in a direction exceeding said limited space of the vertical movement limiting means, said stopper means including a limited gap defined therein for limiting said further vertical movement, with such an arrangement, when an excessive great load is applied to said seat, the vertical movement of both said buffer cover means and free end portion unit due to said excessive great load is limited by said vertical movement limiting means, after which, the excessive vertical movement of said cover means and free end portion is prevented by said stopper means.

* * * * *